(12) United States Patent
Lang et al.

(10) Patent No.: US 6,202,120 B1
(45) Date of Patent: *Mar. 13, 2001

(54) SYSTEM AND METHOD FOR ACCESSING DATA BETWEEN A HOST BUS AND A SYSTEM MEMORY BUS WHERE THE SYSTEM MEMORY BUS HAS A DATA PATH THAT IS TWICE THE WIDTH OF THE DATA PATH FOR THE HOST BUS

(75) Inventors: Marilyn Jean Lang, Milpitas; Sridhar Begur, San Jose; Robert Campbell, Santa Clara; Carol Elise Bassett, Cupertino, all of CA (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/364,480

(22) Filed: Jul. 30, 1999

Related U.S. Application Data

(62) Division of application No. 07/997,620, filed on Dec. 24, 1992, now Pat. No. 5,960,450, which is a continuation of application No. 07/472,066, filed on Jan. 31, 1990, now abandoned.

(51) Int. Cl.[7] .................................................. G06F 12/02
(52) U.S. Cl. ........................ 711/5; 711/157; 710/66; 710/127
(58) Field of Search ........................... 710/66, 127, 128, 710/126; 711/5, 157

(56) References Cited

U.S. PATENT DOCUMENTS

| | | | |
|---|---|---|---|
| 4,467,447 | * 8/1984 | Takahashi et al. | 710/27 |
| 4,489,395 | * 12/1984 | Sato | 712/38 |
| 4,866,603 | * 9/1989 | Chiba | 711/157 |
| 5,307,469 | * 4/1994 | Mann | 711/5 |
| 5,960,450 | * 9/1999 | Lang et al. | 711/5 |

* cited by examiner

Primary Examiner—Richard L. Ellis

(57) ABSTRACT

A microcomputer system memory architecture and method allows the system memory to provide data access at high speeds in a burst mode. The architecture and method utilizes a system memory controller capable of performing the addressing of the system memory. The microprocessor and the system memory communicate via a high speed host bus. The system memory is comprised of multiple 64-bit system memory buses to permit high speed data transfer to the microprocessor in a burst mode without the need for an external cache.

16 Claims, 4 Drawing Sheets

SYSTEM AND METHOD FOR ACCESSING DATA BETWEEN A HOST BUS AND A SYSTEM MEMORY BUS WHERE THE SYSTEM MEMORY BUS HAS A DATA PATH THAT IS TWICE THE WIDTH OF THE DATA PATH FOR THE HOST BUS

CROSS-REFERENCE TO RELATED APPLICATION

This is a divisional of application Ser. No. 07/997,620, filed on Dec. 24, 1992, now U.S. Pat. No. 5,960,450, which is a continuation of application Ser. No. 07/472,066, filed Jan. 31, 1990, now abandoned.

I. FIELD OF THE INVENTION

The present invention relates to the main system memory in a microcomputer system, and more particularly, to a novel system memory architecture and method for allowing data access at high speeds in a burst mode.

II. RELATED ART

Computer systems have traditionally been classified into three groups in the following order in terms of size: mainframe computers, minicomputers, and microcomputers. Size in this context refers to memory size and the number of users as well as the associated management sophistication. Moreover, computer designers of the different computer sizes have varying design priorities, relating to complexity, speed, quantity of data, cost, and the consumer.

Until the invention at hand, a burst mode data transfer from the system memory directly to the central processing unit was considered a sophisticated computer concept for high end computers. Utilization of this concept was limited to computers on the larger and expensive end of the computer spectrum, namely mainframes and minicomputers, which require processing of large quantities of data at high speeds. However, burst mode data transfers could be found internally to microprocessor chip architectures in relation to an internal cache. Thus, although mainframe, minicomputer, and microchip designers were predisposed with the concept of burst mode, microcomputer designers were not so predisposed because of the lack of a need.

As the microcomputer industry evolved, it has become necessary to achieve greater processing speeds in microcomputers which have been progressively used more for compute-intensive applications. These applications include, for example, high resolution graphics displays, high performance computer automated design (CAD) workstations, high speed local area networks (LAN), and recently the new Extended Industry Standard Architecture (EISA) peripherals which are being developed to handle 32-bit burst data transfers at up to 33 megabytes per second. As a result, microcomputer designers, who deal regularly with interfacing discrete computer components are seeking ways to increase the speed of component interaction. It has been realized that most of the microcomputer system's time is utilized during computation or during the movement of data between the system memory and the central processing unit.

Aware of the needs of the rapidly expanding microcomputer industry, microchip designers have designed and developed a microprocessor which can operate on data externally in a burst mode. This microprocessor is the Intel 80486 microprocessor (manufactured by Intel Corporation, California, USA) having an internal 8 Kilobyte internal cache. The Intel 80486 microprocessor was developed to improve the Intel 80386 microprocessor design and to operate externally in a burst mode. *i486 Microprocessor,* Intel Corporation, April 1989, Order Number 240440-001, which is incorporated herein by reference.

Using conventional system memory comprised generally of DRAMs in conjunction with the Intel microprocessors has not fully exploited the microprocessor speed capabilities because of the limited speed of such memories. To maximize the data exchange rate between system memory and the microprocessor, microcomputer designers have been quick to interface external caches with the central processing units to more readily transport system memory data to the central processing unit. Several 80486 machines have been announced by Apricot and Advanced Logic Research having an Intel 80486 microprocessor which is used in conjunction with an external cache.

However, addition of an external cache to the Intel 80486 microprocessor to improve speed has disadvantages. Acquiring data from an external cache is more time consuming than acquiring it from the internal cache of the 80486. An external cache needs to be situated physically near the 80486 microprocessor. The external cache takes up valuable, limited real estate in the microcomputer. Moreover, the external cache represents an additional cost.

Until the present invention disclosed below, no microcomputer system memory in the marketplace or elsewhere has been capable of transferring data in a burst mode directly to the microprocessor without the need for an external cache in order to achieve high processing speeds at a consumer affordable cost. In this regard, see N. Baran, "EISA Arrives," *Byte Magazine,* v. 14, number 12, November 1989 (cover story), which is incorporated herein by reference.

SUMMARY OF THE INVENTION

Representing a substantial effort on the part of several microcomputer designers and engineers over a span of a year, the present invention overcomes the previously mentioned problems and deficiencies in the prior art related to high speed data transfers in a burst mode from system memory directly to the Intel 80486 microprocessor, where no external cache is used.

The present invention comprises a system memory architecture having at least two parallel 64-bit memory buses in electrical communication with a 32-bit host bus. Each 64-bit bus may be connected to a series of single in-line memory (SIMM) modules having dynamic random access memory (DRAM) banks. Moreover, 32-bit bidirectional latching transceivers for each 64-bit bus may be used to transmit data from each 64-bit memory bus to the 32-bit host bus. This memory architecture of the present invention helps to provide fast data acquisition by minimizing the propagation delays caused by the capacitance loading of the SIMMs. More specifically, the 32-bit transceivers can drive a heavier host bus load better than the DRAMs can drive a heavier SIMM memory bus load. The memory architecture of the present invention further permits retrieval of two dwords of data upon each DRAM access, thereby cutting in half the number of necessary DRAM accesses which are relatively slow. Consequently, the memory data speed can approach the speed at which the microprocessor functions.

Another embodiment of the present invention has a host bus connecting the system memory comprised of DRAMs with an Intel 80486 microprocessor. Such compatibility with a conventional microprocessor allows for easy integration into microcomputer architectures. Notwithstanding the use of DRAMs, which are relatively slow compared to cache memories, the system memory achieves extremely fast, data transmission speeds to the Intel 80486 microprocessor.

Yet another embodiment of the present invention is a method of high speed data retrieval from system memory in a microcomputer. The system memory has at least two 64-bit system memory buses connected in parallel to a 32-bit host bus. The method of the present invention involves the steps of selecting one of the 64-bit system memory buses, retrieving 64 data bits from the 64-bit system memory bus, transmitting a first set of 32 data bits of the 64 data bits onto the 32-bit host bus, and transmitting a second set of 32 data bits of the 64 data bits onto said 32-bit host bus. The method permits simultaneously retrieval of two 32-bit dwords and further provides a procedure for transferring 64 data bits onto a 32-bit host bus. Moreover, the latter three steps of the method can be repeated to thereby retrieve 4 dwords in a burst mode from the same 64-bit system memory bus.

Further objects and advantages of the present invention will become apparent to one skilled in the art upon examination of the following drawings and detailed description. It is intended that any additional objects and advantages be incorporated herein.

BRIEF DESCRIPTION OF THE DRAWINGS

The present invention as defined in the claims can be better understood with reference to the text and to the following drawings.

DESCRIPTION OF PREFERRED EMBODIMENT

Figure 1:
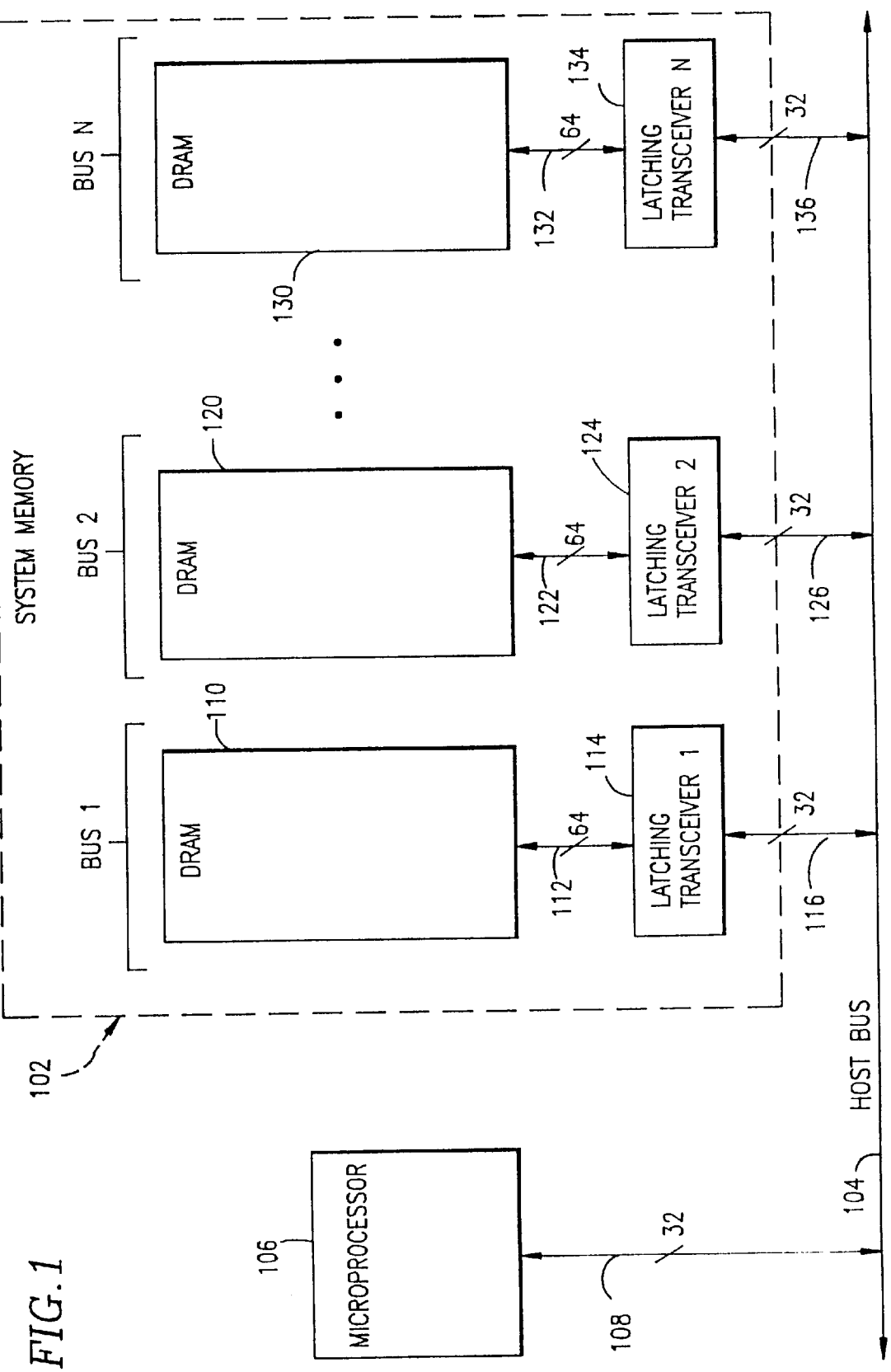
FIG. 1 is a high level block diagram representation of a preferred embodiment of the present invention.

Referring to a preferred embodiment of the present invention as illustrated in FIG. 1, system memory 102 has a number of 64-bit system memory buses 1 to N connected in parallel to a host bus 104. The indicated system memory buses 1, 2 and N include dynamic random access memories (DRAMs) 110, 120, and 130, respectively. The DRAMs 110, 120, and 130 communicate data by way of respective 64-bit buses 112, 122, and 132 to corresponding latching transceivers 114, 124, and 134. The latching transceivers 114, 124, and 134 are connected in parallel to the 32-bit host bus 104 via 32-bit buses 116, 126, and 136, respectively. Finally, the host bus 104 is connected to a microprocessor 106.

The multiple system memory bus architecture of the present invention permits high speed data access from the system memory 102 made up of DRAMs. Multiple buses enhances speed. The reason for this is as follows. When using a single system memory bus, the capacitance of the connected DRAMs is such that operation at high frequencies cannot occur due to the propagation delays. The multiple bus architecture of the present invention reduces the capacitance loading caused by the connected DRAMs, which thereby results in a higher speed (approximately 5 or more nanoseconds higher), predictable delays, and generally a more reliable system. As a result of the system memory architecture of the present invention, the data access speed in some instances can approach the speed at which the microprocessor functions.

The multiple system memory bus architecture of the present invention is particularly useful with processing devices requiring a burst mode data transfer from system memory. For example, the architecture is useful in a microcomputer using an Intel 80486 microprocessor, which is designed to be able to read up to 4 dwords (1 dword=32 bits) in a burst mode. For purposes of this disclosure, a data transfer in a burst mode means that more than one double word, or dword, (32 bits=1 dword) is transferred consecutively. In the present invention, the Intel 80486 microprocessor can retrieve data from the system memory 102 in a burst mode at high speed without the need for an external cache.

Figure 2:
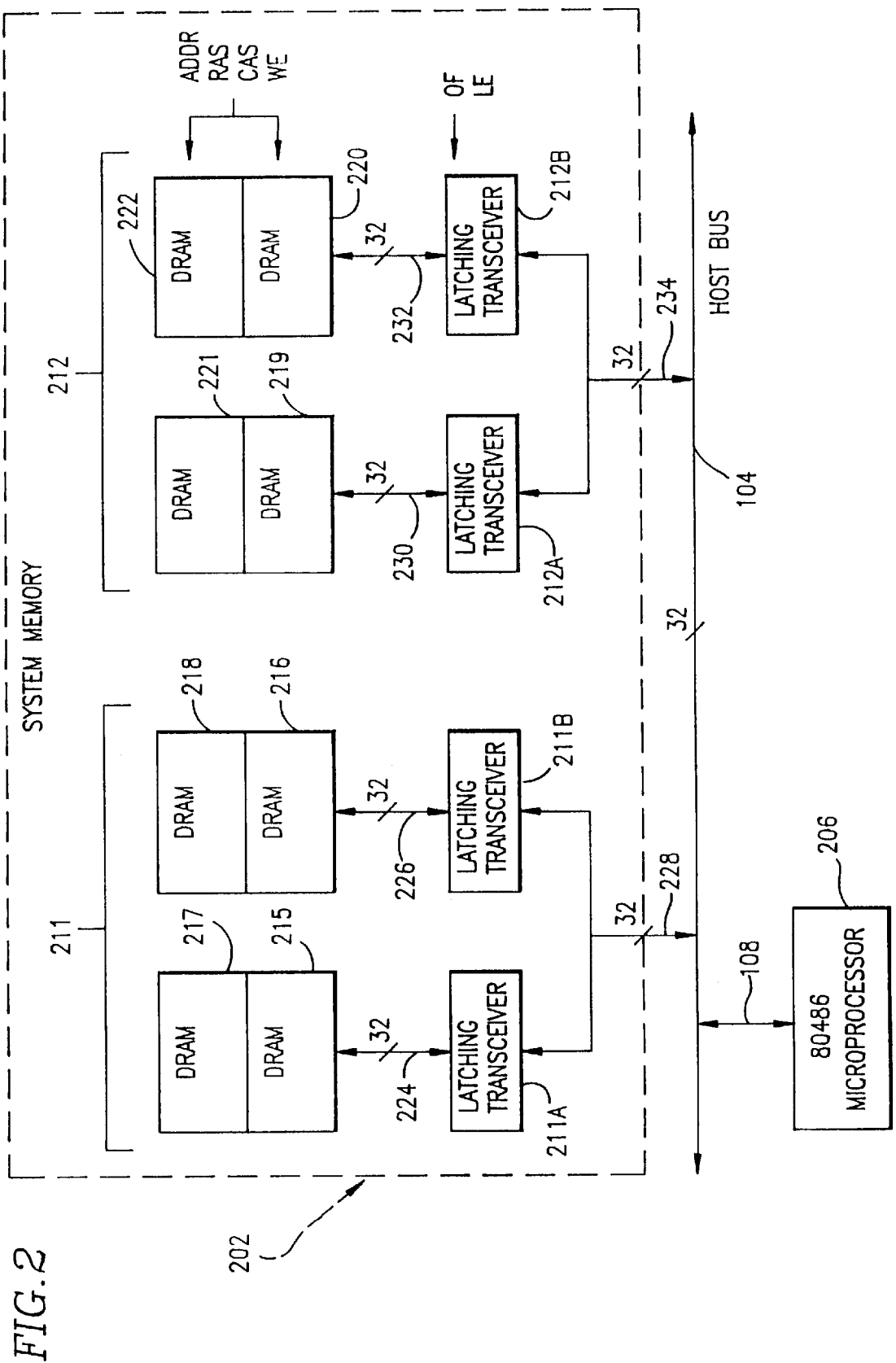
FIG. 2 illustrates a system memory 202 of the present invention having dual system memory buses 211 and 212.

FIG. 2 illustrates another embodiment of the present invention. Data from the system memory 202 can be transferred onto a host bus 104 and then ultimately to an Intel 80486 microprocessor 206 at high speeds in a burst mode. Specifically, the host bus 104 can receive data from the system memory 202 at speeds of up to nearly 50 megabytes per second.

The system memory 202 has two 64-bit system memory buses 211 and 212 connected in parallel to a 32-bit host bus 104 via respective 32-bit buses 228 and 234. Each of these system memory buses 211 and 212 is maintained at a capacitance of less than 100 picofarads in order to permit predictable, high speed operation.

Page mode DRAM for each system memory bus 211 and 212 is connected on SIMM (single in-line memory module) sockets 215–222. System memory bus 211 includes SIMM sockets 215–218 and a pair of latching transceivers 211A and 211B. The DRAMs connected to SIMM sockets 215 and 217 communicate data to the latching transceiver 211A via a 32-bit bus 224. The DRAM connected to SIMM sockets 216 and 218 communicate data to the latching transceiver 211B via a 32-bit bus 226.

System memory bus 212 includes SIMM sockets 219–222 and a pair of latching transceivers 212A and 212B. The DRAMs connected to SIMM sockets 219 and 221 communicate data to the latching transceiver 212A via a 32-bit bus 230. The DRAMs connected to SIMM sockets 220 and 222 communicate data to the latching transceiver 212B via a 32-bit bus 232. Furthermore, all of the 32-bit latching transceivers 211A, 211B, 212A, and 212B are connected to the same 32-bit data lines of the host bus 104. Optimally, each SIMM socket services a double density SIMM, which is a SIMM with two DRAM banks.

The addressing scheme and control signals to the two pairs of latching transceivers 211A,211B and 212A,212B can be of any conventional design. In the present invention, the addressing and transmission of control signals is performed by the system memory controller 308.

The DRAM memory locations in the embodiment of FIG. 2 are broken down into pages addressable by rows (for the page) and columns. The necessary control signals from the system memory controller 308 to the system memory 202 include latch enable (LE) and output enable (OE) for both directions (read and write) of the latching transceivers 211A, 211B, 212A, and 212B, as well as row address strobe (RAS), column address strobe (CAS), and write enable (WE) for the DRAM connected to SIMM sockets 215≅222. Because the present invention is related to a system and method for reading from system memory, the control signal OE for the write direction of the latching transceivers are not discussed below.

During a burst mode read from the system memory 202 to the Intel 80486 microprocessor 206, one of the system memory buses 211 or 212 is put into operation. The discussion hereinafter focuses on the operation of the embodiment when system memory bus 211 is active. It is appreciated that system memory bus 212 would function identically to system memory bus 211.

Two dwords of data (two dwords=64 bits) are simultaneously read from the DRAMs of either SIMM sockets 215 and 216 or 217 and 218. One dword comes from the DRAM in either SIMM sockets 215 or 217, while the other dword comes from the DRAM located in SIMM socket 216 or 218. Appropriate CAS and RAS signals are sent to the page mode DRAMs (with a RAS access time, for example, of approximately 80 nanoseconds and a cycle time of, for example, approximately 160 nanoseconds) to define which DRAMs are operative during the 64-bit read. Each dword is latched into the pair of 32-bit latching transceivers 211A and 211B by the issuing of a LE signal to the pair of latching transceivers. Reading two dwords at a time helps to achieve the high speed data transfer of the system memory architecture of FIG. 2.

After latching the two dwords, the pair of latching transceivers 211A and 211B are alternately output enabled, or "toggled," through transmission of OE signals. Consequently, the latched 32-bit dwords are alternately sent onto the host bus 104 via 32-bit bus 228. Thus, a 1st and then a 2nd dword are consecutively sent (burst mode) to the Intel 80486 microprocessor 206. This toggling operation permits transferring dwords in a burst mode at high speed.

The operation as previously discussed could be repeated to send as many dwords as desired onto the host bus 104. A successive 64-bit read resulting in a 3rd and 4th dword transfer could be undertaken from the same system memory bus or from the other of the two 64-bit buses 211 and 212. If only a 3rd dword is desired by the Intel 80486 microprocessor 206, the control signal OE to the appropriate latching transceiver is merely terminated. Further, it is envisioned that N number of successive reads could be undertaken in the embodiment of FIG. 2 from system memory 202 to thereby transfer up to 2N number of dwords to the Intel 80486 microprocessor 206.

Moreover, any combination of system memory bus activation and deactivation may be utilized to retrieve data. A simultaneous 64-bit read on each of the dual system memory buses 211 and 212 could take place with subsequent toggling of appropriate latching transceivers to deliver 32-bit dwords.

Figure 3:
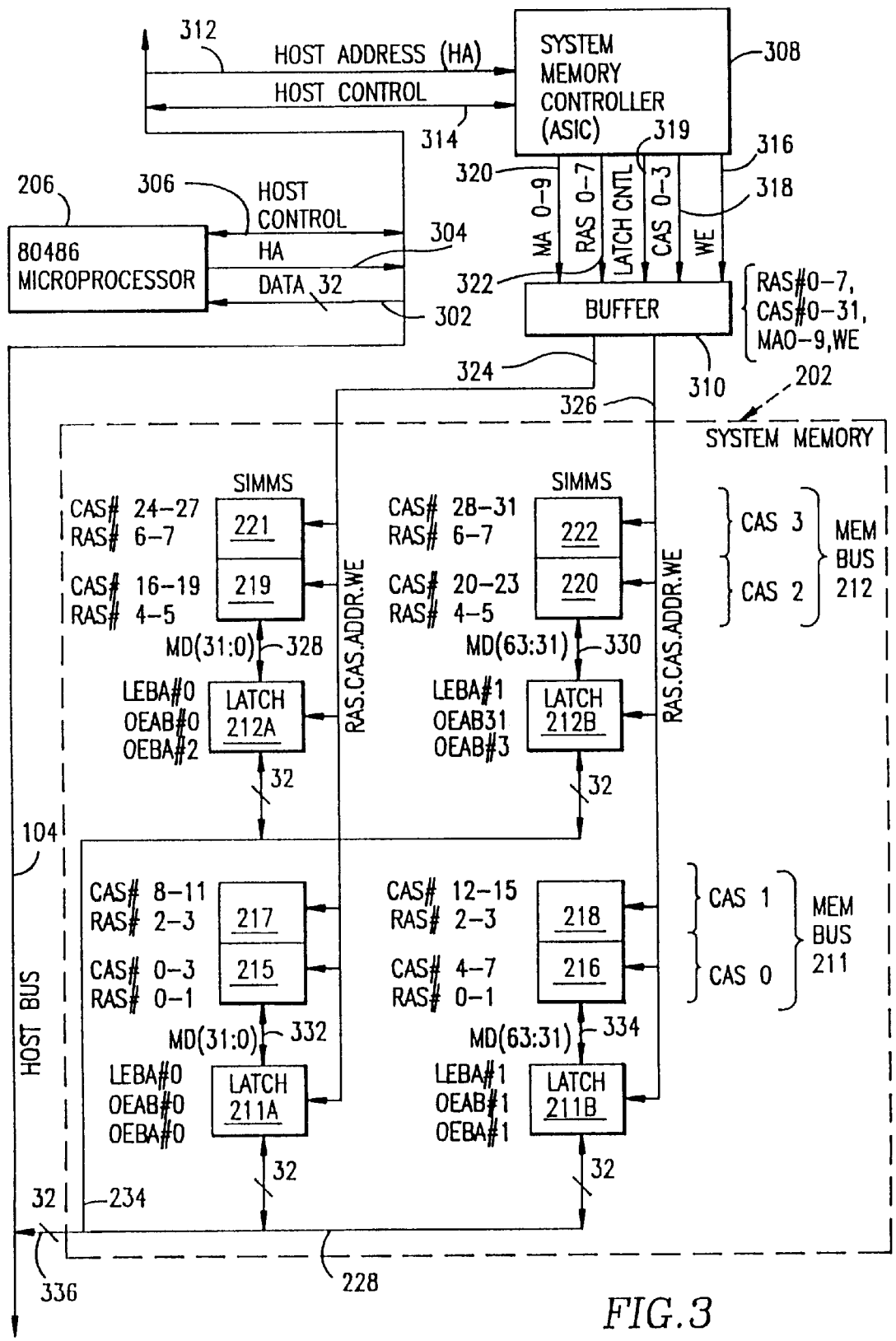
FIG. 3 illustrates in detail the interconnection between the embodiment of FIG. 2 and a system memory controller 308.

FIG. 3 illustrates an embodiment of the present invention similar to the one shown in FIG. 2 but with the addition of a system memory controller 308. The embodiment of FIG. 3 can be used to transfer dwords from the system memory 202 to the Intel 80486 microprocessor 206 at high speeds in a burst mode of 2 or 4 dwords.

The system memory controller 308 in this embodiment has been fabricated as an ASIC (application specific integrated circuit). It should be noted, however, that any other appropriate fabrication presently known or developed in the future can be used for the system memory controller 308. Under the control of the Intel 80486 microprocessor 206 via host bus 104, the system memory controller 308 provides the requisite addressing and control signals to the system memory 202 as discussed in relation to FIG. 2 through buffer 310.

Referring again to FIG. 3, to manipulate the system memory 202, the system memory controller 308 operating at, for example, 25 megahertz drives WE (write enable), CAS 0:3 (column address strobe, lines 0 through 3), RAS 0:7 (row address strobe, lines 0 through 7), and MA 9:0 (memory address, lines 9 through 0) to the system memory 202. The system memory controller 308 further drives the OEBA 0:3 (output enable B to A; B to A is the direction from the system memory 202 to the host bus 104), OEAB 0:1 (output enable A to B; during WE) and NLEBA 0:1 (latch enable B to A) of the latching transceivers 211A, 211B, 212A, and 212B. Worth noting is that the system memory 202 can be driven at a higher frequency clock rate than 25 Megahertz (Mhz). Future embodiments of the system memory controller 308 will operate the system memory 302 at higher frequencies, such as for example at 33 Megahertz. These future embodiments utilizing the same system memory configuration are intended to be included herein.

The data locations in the system memory 202 of FIG. 3 are specified by rows (also, banks or pages) and columns. In order to access memory locations in the banks of the system memory 202, a row address and then a column address is issued by the system memory controller 308 to each DRAM located on each of SIMM sockets 215–222 in order to retrieve data. The row address indicates the bank, while the column address indicates which bytes on the page will be accessed. The row and column addresses are multiplexed over MA 9:0 (memory address, lines 9 to 0) which connects to each DRAM module. The signals on MA 9:0 from system memory controller 308 to system memory 202 during addressing are either column addresses or row addresses and are latched into a particular module by an appropriate RAS (row address strobe) and CAS (column address strobe).

Eight DRAM banks 0–7 (using double density DRAM modules in each SIMM socket) are present on the SIMM sockets 217–222. DRAM banks 0–3 exclusively comprise one 64-bit system memory bus on SIMM sockets 215–218, whereas memory banks 4–7 exclusively comprise the other 64-bit system memory bus on SIMM sockets 219–222. The CAS lines are connected to the DRAM banks 0–7 as indicated in Table A below.

TABLE A

| SIMM Socket | DRAM Bank # | CAS |
| --- | --- | --- |
| 215 | 0,1 | 0 |
| 216 | 0,1 | 0 |
| 217 | 2,3 | 1 |
| 218 | 2,3 | 1 |
| 219 | 4,5 | 2 |
| 220 | 4,5 | 2 |
| 221 | 6,7 | 3 |
| 222 | 6,7 | 3 |

If single density DRAMs were used instead of double density, the odd numbered DRAM banks in Table A would not be present, but the system memory 202 would function in the same manner. Moreover, in the present invention each of RAS 0:7 is connected to a corresponding DRAM bank 0–7.

In order to supply the control signals, the system memory controller 308 counts on the fact that the address sequence (HA 25:2) for 4 dwords transmitted from the Intel 80486 microprocessor 206 operating in a burst mode is always known once the first address is known. With this knowledge, the system memory controller 308 can pursue any of the different sequences depending on the starting address for the first dword in the burst mode by driving address-specific control signals to system memory 202. This addressing procedure enables the system memory controller 308 to provide addressing of data locations in system memory 202 after receiving an initial address from the Intel 80486 microprocessor 206 without having to wait for the subsequent addresses pertaining to subsequent dwords sought by the Intel 80486 microprocessor 206.

More specifically, during an addressing sequence from the Intel 80486 microprocessor 206 in a 4 dword burst mode, a symmetry exists with regard to bits HA3 and HA2. In terms of HA 3:2, the possible sequences that can come from the Intel 80486 microprocessor 206 in a burst mode are as follows:

TABLE B

| Possible Dword Sequences | HA3,HA2 | | | |
| --- | --- | --- | --- | --- |
| | 1st dword | 2nd dword | 3rd dword | 4th dword |
| 1 | 0,0 | 0,1 | 1,0 | 1,1 |
| 2 | 0,1 | 0,0 | 1,1 | 1,0 |
| 3 | 1,0 | 1,1 | 0,0 | 0,1 |
| 4 | 1,1 | 1,0 | 0,1 | 0,0 |

After careful consideration of the sequences, it is apparent that HA2 changes state, or "toggles," on each dword. Moreover, HA3 toggles its logic state from the 1st and 2nd dwords to 3rd and 4th dwords in any given sequence. Therefore, the control signals (OEBA 3:0, NLEBA 1:0) from the system memory controller 308 to the latching transceivers 211A,B and 212A,B as well as the DRAM memory addresses (MA 9:0), can all be based on the initial states of the HA3 and HA2 bits which are known.

Figure 4:
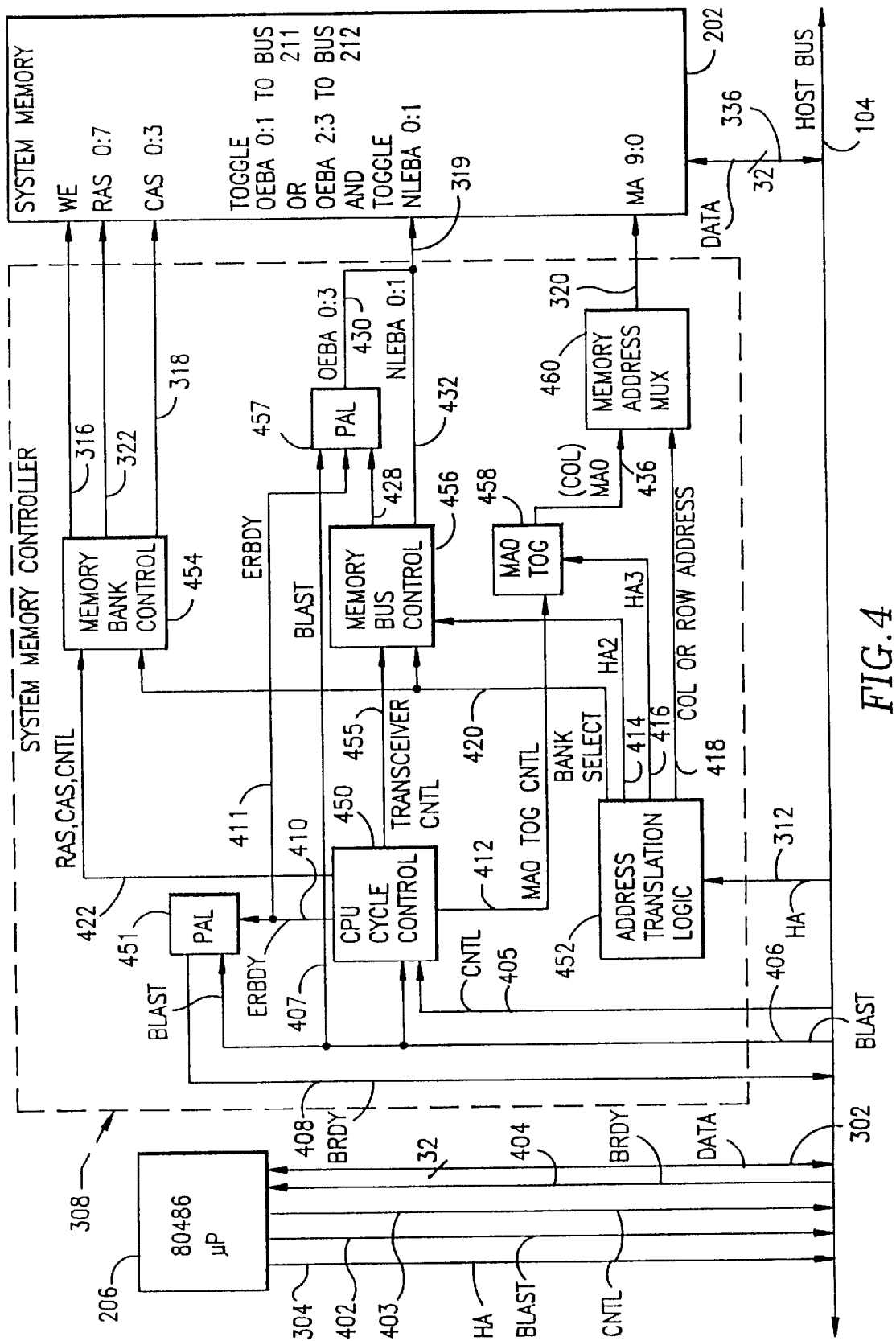
FIG. 4 shows a more detailed block diagram representation of the system memory controller 308 of FIG. 3.

FIG. 4 illustrates in detail an embodiment of the memory controller 308 of FIG. 3. With reference to FIG. 4, the system memory controller 308 is comprised of the following: a CPU cycle control 450, a programmable array logic (PAL) 451, an address translation logic 452, a memory bank control 454, a system memory bus control 456, a PAL 457, an MAO tog 458, and a memory address multiplexor 460. All are conventionally constructed logic circuits. Moreover, all are constructed using ASIC technology in the present invention with the exception of the external PALs 451 and 457. Any configuration of logic to accomplish the function described below may be utilized.

The operation of the system memory controller 308 in conjunction with the system memory 202 during a burst mode is described below in terms of time steps T1–T10. Several events can occur during each T step. Moreover, one T step equals one clock cycle. Worth noting is that a wait state between T steps can be added to make the system more adaptable.

TIME T1

In operation at time T1, a 32-bit host address (HA 32:2) is sent from the Intel 80486 microprocessor 206 to the address translation logic 452 of the system memory controller 108 via bus 304, host bus 204, and bus 312. The host address is followed by an address strobe ADS sent to the CPU cycle control 450 by way of control line 403, host bus 204, and control line 405. Moreover, control signals (M/10= 1; D/C=0 for a code read, or else D/C=1 for a data read; W/R=0) to indicate a system memory read are sent to the CPU cycle control 450 by the Intel 80486 microprocessor 206 through control line 403, host bus 204, and control line 405.

The address translation logic 452 serves to take HA 25:2 (first address) from bus 312 and translate those addresses into row and column addresses (second addresses). The system memory 202 of DRAMs is broken down into pages, wherein a row address specifies the page and the column address specifies the column on a particular page.

The CPU cycle control 450 handles the communication of control signals between the Intel 80486 microprocessor 206 and the system memory controller 108. During time T1, the CPU cycle control 450 of the system memory controller 108 does not sample the BLAST control line 406 allocated to the BLAST signal (sampling during time T4; discussed in detail below). Accordingly, either a single dword read or a burst mode dword read of 2 or 4 dwords could subsequently follow time T1.

TIME T2

The Intel 80486 microprocessor 206 removes the ADS from control line 403 and therefore the host bus 204 during time T2. If the Intel 80486 microprocessor 206 wishes to read more than one dword, that is, read in a burst mode, a BLAST signal on control line 402 is sent via the host bus 204 and control line 406 to the CPU cycle control 450 of the system memory controller 108. The address translation logic 452 of the system memory controller 108 consequently reads the host address from the host bus 204 via bus 312.

The address translation logic 452 selects one of the DRAM memory banks 0–7 and communicates this information to memory bank control 454 and to system memory bus control 456 through line 420. Any conventional scheme of bank selection can be utilized. Recall that memory banks 0–3 exclusively comprise one 64-bit system memory bus, whereas memory banks 4–7 exclusively comprise the other 64-bit bus. Consequently, at this point, a system memory bus (either 211 or 212 in FIG. 3) has been selected due to the selection of a memory bank. This selection is maintained throughout the entire burst mode sequence of reads. Consequently, all dwords will come from the same system memory bus.

The system memory bank control 454 provides the appropriate CAS and RAS signals through respective buses 318 and 322 to the memory bank selected by the address translation logic 452. The system memory bank control 454 responds to control from the CPU cycle control 450 via line 422. Accordingly, one of CAS 0:3 is selected which enables only a pair of DRAM memory banks, as indicated in Table A. One of RAS 0:7 on bus 322 are also enabled corresponding to the selected pair of DRAM memory banks.

Under the control of the CPU cycle control 450 through line 455, the system memory bus control 456 essentially serves to repeatedly change, or "toggle," the states of NLEBA 0:1 and either OEBA 0:1 or OEBA 2:3 via bus 428, PAL 457, and bus 430. The pair NLEBA 0:1 is toggled after the 2nd and 4th dword reads, whereas the appropriate pair of OEBAs is toggled after each dword read.

For the 1st dword read at time T2, the system memory bus control 456 asserts in an active state both of NLEBA 1:0. This assertion of NLEBA 1:0 enables data to flow through the latching transceivers. However, only the pair of latching transceivers (311A,311B or 312A,312B in FIG. 3) of the selected system memory bus will read data because of the RAS and CAS control signals on lines 322 and 318, respectively.

Also during time T2, a WE signal is asserted to the DRAMs for a read state. It is driven to the DRAMs on line 316 from the memory bank control 454. The signal needs to be sent prior to the CAS on line 318 to implement a DRAM read function.

TIME T3

At time T3, one of OEBA 3:0 on bus 428 is asserted active by the system memory bus control 456, thereby eventually putting into operation only one of the latching transceivers (311A, 311B, 312A, or 312B in FIG. 3). The actuation of the appropriate latching transceivers is delayed by the PAL 457 until time T4.

The decision on which latching transceiver to activate is made by the memory bus control 456 based on the state of HA2 and the bank selected which are both transmitted to the memory bus control 456 by the address translation logic 452. If HA2=0, one of OEBA 2 or OEBA 0 is asserted active, otherwise one of OEBA 3 or OEBA 1. The states of the selected pair of OEBA are permitted to change state, or "toggle," on subsequent dword reads as will be later discussed. In the preferred embodiment, the pair OEBA 1:0 was arbitrarily selected for the initial address.

The memory bank control 454 sends the appropriate CAS and RAS through corresponding buses 318 and 322 to system memory 202 which activates one of the DRAM banks 0–7. The CAS specifies a DRAM pair (0,1 or 2,3 or 4,5 or 6,7), and the RAS indicates which bank in the pair is to be accessed.

The address translation logic 452 sends via bus 418, memory address multiplexor 460, and bus 320, an address MA 9:0 along with the CAS and RAS on respective lines 318 and 322 to all of the system memory locations. Each transmission of MA 9:0 on bus 320 is a column address or a row address. Recall that system memory is organized into banks with rows and columns based on HA25–HA4. Furthermore, at time T5, under the control of the CPU cycle control 450, MAO tog 458 toggles the state of the MAO bit after the two dword reads i.e., before the CAS of the 3rd dword read, thereby changing the column address contained in MA 9:0 on line 320.

A EBRDY signal is placed on line 410 by the CPU cycle control 450. The signal will ultimately reach the Intel 80486 microprocessor 206 via line 410, PAL 451, line 408, host bus 204, and line 404. For purposes of this discussion, after the EBRDY signal reaches the PAL 451, it is referred to as a BRDY signal. The BRDY signal indicates that the system memory controller 108 is ready to supply data in a burst mode and that a valid data dword is on the host bus 204. EBRDY is latched in PAL 451 to delay the signal until valid data is actually on the host bus 204 for retrieval by the Intel 80486 microprocessor 206 at time T4. Thus, the EBRDY (or BRDY) signal is pipelined.

TIME T4

The latched OEBA signal sent at time T3 is transmitted from the PAL 457 to the appropriate latching transceiver on bus 430. The latching transceiver outputs the 1st dword onto the host bus 204 via host data bus 318. The 1st dword is read from the half of the 64-bit memory bank where the NLEBA, OEBA, CAS, RAS, and address MA 9:0 coincide in system memory 202.

Under the supervision of the CPU cycle control 450 through transceiver control line 455, the system memory bus control 456 toggles the OEBA pair for the next dword (2nd dword) on bus 428. The states of OEBA3:2, or in the alternative OEBA1:0, are toggled depending on the initial state of HA2 as previously discussed at time T2. Hence, the system memory controller 108 does not wait to sample the BLAST signal or control line 406 before issuing OEBAs for subsequent dword reads. As a result, performance is enhanced.

The Intel 80486 microprocessor 206 now receives via control line 404, host bus 204, and control line 408, the latched BRDY signal in PAL 451, which was sent one clock cycle earlier as EBRDY at T3 by the CPU cycle control 450. The Intel 80486 microprocessor 206 strobes in the 1st dword of data from the host bus 204 via bus 302.

The CPU cycle control 450 samples the BLAST line 406. If no more dwords are to be read by the Intel 80486 microprocessor 206 (the 80486 wants only 1 dword), the pending OEBA latched in the PAL 457 is terminated during time T5. Further, EBRDY from the CPU Cycle Control is deasserted on line 410.

At times T5 and T6 described below, the system memory controller 108 implements the 2nd dword burst transfer to the Intel 80486 microprocessor 206. These actions could conceivably be shortened into one clock cycle so that the 2nd dword takes only one clock to be transferred to the 80486. This would require logic changes beyond and different from having the T6 actions occurring during the second half of time T5.

TIME T5

The Intel 80486 microprocessor 206 will assert the BLAST signal on Blast control line 402 if this is a two dword burst.

The OEBA for the second dword is transmitted from the PAL 457 on line 430 to the appropriate latching transceiver. As a result, the 2nd dword is enabled onto the host bus 204 through host data bus 318. The BRDY signal is deasserted by the PAL 451, based on the earlier deasserted EBRDY. The data could be read by the Intel 80486 microprocessor 206 at the end of time T5, but in the preferred embodiment of FIG. 4, it is forced to wait until time T6 due to other requirements beyond the scope of the present invention.

System memory bus control 456 deasserts NLEBA 1:0 on line 432 to latch 64 data bits into the same latching transceivers selected at time T2. The state of the MAO bit on line 436 is toggled by MAO tog 458 to set up the next column address for this 64-bit read. MAO tog 458 toggles MAO to its opposite logic state to fulfill the known address requirements of the 3rd and 4th dword addresses from the 80486 microprocessor 206. See Table B with the associated discussion.

A EBRDY signal on EBRDY control line 410 is asserted by the CPU cycle control 450 and latched into PAL 451 in order to allow the Intel 80486 microprocessor 206 to sample the 2nd dword during time T6.

TIME T6

The OEBA is maintained by the system memory bus control 456 at the same state as in time T5, while the EBRDY signal on control line 410 is still maintained by the CPU cycle control 450 for the 3rd dword.

The memory bank control 454 asserts the same CAS and RAS on respective lines 318 and 322 selected at time T2 in order to begin the read of the second 64 bits onto the host bus 204. The read takes place from the same bus and the same memory bank as did the first 64-bit read (1st and 2nd dword, each having 32 bits). One of the NLEBA 0:1 on bus 432 is asserted low (if the original HA2=0 then NLEBA0 is asserted low, otherwise NLEBA1) to maintain the 2nd dword in the latching transceiver, while allowing the 3rd dword (from the second 64-bit read) to flow through. MAO is maintained at the toggled value (second CAS address). The OEBA pair is then toggled so that the original OEBA will be asserted again while the other OEBA of the pair is deasserted.

The Intel 80486 microprocessor 206 samples BRDY on control line 404 at the end of time T6 and strobes in the 2nd dword of data from host bus 204 through host bus 302. If the Intel 80486 microprocessor 206 removes the BLAST signal on line 402, thus indicating the desire to read only 2 dwords, the pending OEBA for the next clock are terminated at the PAL 457 (OEBA will be flushed at time T7). The pending BRDY signal is terminated at its PAL 451, and the CAS signal on bus 318 will be deasserted in the next time T7.

TIME T7

The OEBA pair is again toggled at the PAL 457 through bus 430 pursuant to the order of the system memory bus control 456. The 3rd dword (first dword of the second 64-bit read) is enabled onto the host bus 204 through bus 318.

At this point in time in the operation of the present invention, a signal different than EBRDY, but having the identical purpose, is sent from the system memory controller 308. This signal is ultimately destined for the RDY pin on the 80486 microprocessor 206. This signal is pipelined through a PAL (not shown) and clocked in the same fashion as the EBRDY signal.

Because this signal and the EBRDY signal are identical in purpose and because only a minor design change to the EBRDY signal would be needed to implement the EBRDY signal, the discussion that follows makes reference only to the EBRDY signal.

The EBRDY signal is again asserted on line 410 by the CPU cycle control 450 for the 4th dword and latched into PAL 451. At the same time, BRDY is asserted on line 408 by PAL 451 for the 3rd dword.

The memory control bank 454 continues to assert CAS on line 318, while the MAO tog 458 on line 436 asserts MAO at the toggled value. Both NLEBA 0:1 on line 432 are now asserted low to enable all 64 bits of the second read to flow into the latching transceivers of the selected system memory bus 211 or 212.

At this point, the OEBA pair is toggled again to enable the 4th dword to be put on the host bus 204 through bus 318 during time T8.

TIME T8

The Intel 80486 microprocessor 206 asserts the BLAST signal on control line 402 to indicate this is the last dword it wishes to read, and strobes in the 3rd dword of data from the host bus 204 through bus 302. The CPU Cycle Control 450 deasserts EBRDY on line 410 because no new data will be returned during the next clock.

The OEBA pair toggled during time T7 causes the toggling of the signal at bus 430. Accordingly, the 4th dword (second of the 2nd two dword read) is enabled onto the host bus 204 through bus 318.

The memory bank control 454 continues to assert the CAS on line 318 while the system memory bus control 456 continues to assert NLEBA on line 432. MAO on line 436 is restored to its original value (state of initial HA3) by MAO tog 458. The OEBA signals on line 428 from the system memory bus control 456 are deasserted. BROY on line 408 is again asserted by PAL 451 which originated from the earlier asserted EBRDY. The Intel 80486 microprocessor 206 samples the BRDY signal on line 404 at the end of time T8 and strobes in the 4th dword of data through bus 302 from the host bus 204.

TIME T9

The Intel 80486 microprocessor 206 may begin a new cycle by asserting new address and control signals, or it may release the host bus 204 by sending appropriate control signals through control line 403.

System memory controller 108 deasserts all CAS signals on line 318 to end the read, and deasserts both NLEBA 0:1 on line 432. The system memory controller 108 now considers the read completed.

TIME T10

During time T10, both NLEBA 0:1 on bus 432 are reasserted to allow data to flow through the latching transceivers in preparation for a possible new read cycle.

Hence, during time T1 to time T10 the system memory controller 108 provides the necessary control signals and second addresses for the system memory 202 of FIG. 3.

What is claimed is:

1. A method for transferring data within a system memory directly onto a host bus within a microcomputer system, the data within the system memory being retrieved and stored through a system memory bus, a data path of the system memory bus being twice as wide as a data path for the host bus, the host bus providing a communication link between the system memory and a system processor, the method comprising the following steps:

(a) selecting a first set of data bits to be placed on the system memory bus;

(b) transferring a first half of the data bits selected in step (a) onto the host bus, the transfer being done directly from the system memory bus to the host bus without transmission through a memory control unit;

(c) transferring a second half of the data bits selected in step (a) onto the host bus, the transfer being done directly from the system memory bus to the host bus without transmission through a memory control unit;

(d) selecting a second set of data bits to be placed on the memory bus;

(e) transferring a first half of the data bits selected in step (d) onto the host bus, the transfer being done directly from the system memory bus to the host bus without transmission through a memory control unit;

(f) transferring a second half of the data bits selected in step (d) onto the host bus, the transfer being done directly from the system memory bus to the host bus without transmission through a memory control unit.

2. A system for high speed data access in a microcomputer computer, comprising:

a host bus having a data path which is a first number of bits wide;

a system memory, coupled to the host bus, the system memory comprising:

at least two system memory buses, each system memory bus having two sections, a data path of each section being the first number of bits wide, data within the system memory being retrieved and stored through the at least two system memory buses, wherein for a single data access on one of the system memory buses, two data accesses are made on the host bus, data being transferred directly between the system memory buses and the host bus without transmission through a memory control unit; and, a system processor, coupled to the host bus, the host bus providing a communication link between the system processor and the system memory.

3. A system according to claim 2, wherein during data retrieval system memory is read in parallel.

4. A system according to claim 2, wherein the system memory additionally comprises SIMMs coupled to the system memory buses.

5. A system according to claim 4, wherein the system memory additionally comprises page mode DRAMs situated on the SIMMs.

6. A system according to claim 2, wherein the host bus operates synchronously with the system processor.

7. A system according to claim 2, wherein the system memory buses operate synchronously with the host bus.

8. A system according to claim 2, wherein the host bus can access data in the system memory with a bandwidth of at least 50 megabytes per second while operating in a burst mode.

9. A system according to claim 2, wherein the system memory is controlled by a system memory controller.

10. A system according to claim 9, wherein the system memory controller is driven at a clock speed of at least 25 Megahertz.

11. A system according to claim 2, wherein the system processor is driven at a clock speed of at least 25 Megahertz.

12. A method of data retrieval from a system memory having at least two parallel system memory buses, each of the two parallel system memory buses being located within the system memory, data within the system memory being retrieved and stored through the at least two system memory buses, a host bus providing a communication link between the system memory and a system processor, a data path for each of the system memory buses being twice as wide as a data path for the host bus, the method comprising the following steps:
  (a) selecting one of the system memory buses;
  (b) accessing data bits across an entire data path of the system memory bus selected in step (a);
  (c) electrically transmitting a first half of the data bits accessed in step (b) onto the host bus, the transmission being done directly from the svstem memory bus to the host bus without transmission through a memory control unit; and,
  (d) electrically transmitting a second half of the data bits accessed in step (b) onto the host bus, the transmission being done directly from the system memory bus to the host bus without transmission through a memory control uni.

13. A method of transferring data between a system memory and a host bus, the host bus providing a communication link between the system memory and a system processor, the method comprising the following step:
  (a) retrieving data from the system memory through at least two parallel system memory buses, each of the at least two parallel system memory buses being located within the system memory and a data path for each of the system memory buses being twice as wide as a data path for the host bus, including the following substeps:
    (a.1) when accessing data using a first system memory bus from the at least two parallel system memory buses, alternately accessing a first half of a data path for the first system memory bus and a second half of the data path for the first system memory bus, the accessing of data being done directly between the first system memory bus and the host bus without transmission through a memory control unit, and
    (a.2) when accessing data using a second system memory bus from the at least two parallel system memory buses, alternately accessing a first half of a data path for the second system memory bus and a second half of the data path for the second system memory bus, the accessing of data being done directly between the second system memory bus and the host bus without transmission through a memory control unit.

14. A method as in claim 13 additionally comprising the following step:
  (a) storing data to the system memory through the at least two parallel system memory buses, including the following substep:
    (a.1) when storing data using the first system memory bus, alternately transferring the data using the first half of the data path for the first system memory bus and the second half of the data path for the first system memory bus, and
    (a.2) when storing data using the second system memory bus, alternately transferring the data using the first half of the data path for the second system memory bus and the second half of the data path for the second system memory bus.

15. A system for high speed data access in a microcomputer computer, comprising:
  a host bus having a data path which is a first number of bits wide;
  a system memory, coupled to the host bus, the system memory comprising:
    a system memory bus within the system memory, the system memory bus having two sections, a data path of each section being the first number of bits wide, data within the system memory being retrieved and stored through the system memory bus, wherein for a single data access on the system memory bus, two data accesses are made on the host bus, accessing of data being done directly between the system memory bus and the host bus without transmission through a memory control unit; and,
  a system processor, coupled to the host bus, the host bus providing a communication link between the system processor and the system memory.

16. A system as in claim 15 wherein the first number is 32.

* * * * *

UNITED STATES PATENT AND TRADEMARK OFFICE
CERTIFICATE OF CORRECTION

PATENT NO.    : 6,202,120 B1  
DATED         : March 13, 2001  
INVENTOR(S)   : Lang et al.

Page 1 of 1

It is certified that error appears in the above-identified patent and that said Letters Patent is hereby corrected as shown below:

<u>Column 13,</u>
Line 42, delete "uni" and insert therefor -- unit --

Signed and Sealed this

Twenty-eighth Day of January, 2003

JAMES E. ROGAN  
*Director of the United States Patent and Trademark Office*